Patented Feb. 22, 1938

2,109,143

UNITED STATES PATENT OFFICE 2,109,143

DRY DISINFECTANT FOR SEEDS

Fritz Wolff, Berlin, Germany, assignor to Schering-Kahlbaum A. G., Berlin, Germany, a corporation of Germany No Drawing. Application March 20, 1934, Serial No. 716,503. In Germany March 22, 1933

8 Claims. (Cl. 167—38)

This invention relates to dry disinfectant for seeds and more particularly to non-dusting dry disinfectants.

It is known that the dusting of dry disinfectants may be prevented by the addition of certain oils, such as petroleum oils, resin oil and some others. But the latter has a detrimental influence upon the fungicidal power of the disinfectant in case the fungicide contained therein is water-soluble and present only in comparatively small quantities. To illustrate this detrimental effect of the addition of such oils to said type of seed disinfectants the following examples are given:

Dry seed disinfectant consisting of 5% of mercury chloride and 95% of talcum and applied in concentrations of 2:1000 yields bunt-free wheat.

The same disinfectant consisting of 5% of mercury chloride, 90% of talcum and 5% of paraffin oil still shows some bunt ears.

The reason for the insufficient fungicidal power of a seed disinfectant containing such oils in order to prevent excessive dusting is that the action of the mercury chloride is partly prevented by the water-insoluble oil film covering the fungicide.

One object of this invention consists in eliminating this disadvantage and in producing non-dusting seed disinfectants of high efficiency. For this purpose fatty substances possessing a high water-absorbing capacity are added to the latter instead of the water-insoluble oils used hitherto. Such substances are for instance, wool fat, wool wax, lanolin, isocholesterin and the like. Wool fat is capable of absorbing at room temperature 2½ times its weight of water whereby a salve-like stable mass is formed, which is especially suitable for the purpose in question.

It has furthermore been found that the addition of the above mentioned substances exerts a very favorable influence upon the adhesive capacity of the seed disinfectants. Thereby the amount of said addition can be increased without reducing the fungicidal power until a friable mass is obtained.

When using only small amounts of water-soluble fungicides the additions claimed offer the advantage that the fungicide can be dissolved in water and added to said additions whereupon the filling material is gradually impregnated with the mixture of the fungicide and the addition, which prevents the dusting and increases the adhesive capacity of the seed disinfectant. The water present has no disturbing effect upon the proportions of said disinfectants; for, it is combined in a stable form with the substance claimed.

The following examples serve to illustrate the invention without, however, limiting the latter to the same.

Example 1

| | Grams |
|---|---|
| Mercury chloride | 5 |
| Wool fat | 2 |
| Isocholesterin | — |
| Lanolin | — |
| Lecithin | — |
| Water | 3 |
| Talcum | 90 |

Example 2

| | Grams |
|---|---|
| Mercury chloride | 5 |
| Isocholesterin | 4 |
| Talcum | 91 |

Example 3

| | Grams |
|---|---|
| Mercury chloride | 5 |
| Lanolin | 5 |
| Talcum | 90 |

Example 4

| | Grams |
|---|---|
| Mercury chloride | 5 |
| Isocholesterin | 2 |
| Water | 3 |
| Talcum | 90 |

Example 5

| | Grams |
|---|---|
| Mercury chloride | 5 |
| Lecithin | 4 |
| Talcum | 91 |

Instead of mercury chloride other fungicidal substances or mixtures of the same may also be used, as follows from the further examples:

Example 6

| | Grams |
|---|---|
| Ortho hydroxyphenyl mercury chloride | 10 |
| Lanolin | 4 |
| Talcum | 86 |

Example 7

| | Grams |
|---|---|
| Anhydride of the hydroxyphenyl mercury hydroxide | 8 |
| Brought into solution by phenol | 16 |
| Lecithin | 5 |
| Kaolin | 71 |

Example 8

| | Grams |
|---|---|
| Sodium salt of the cyano mercury cresol | 10 |
| Water | 10 |
| Isocholesterin | 5 |
| Talcum | 75 |

Example 9

| | Grams |
|---|---|
| Sodium salt of the para hydroxy phenyl mercury acetate | 10 |
| Wool fat | 5 |
| Talcum | 85 |

Example 10

| | Grams |
|---|---|
| Copper ethyl sulfate | 20 |
| Wool wax | 10 |
| Talcum | 70 |

Example 11

| | Grams |
|---|---|
| Methyl mercury nitrate | 5 |
| Lecithin | 5 |
| Kaolin | 90 |

Wheat infected by bunt (*Tilletia tritici*) is treated with said disinfectants preferably in the proportion of 2:1000. The power of germination is between 98 to 99% within 5 days while no bunt ears are observed. The above disinfectants do not dust and show an excellent adhesive capacity. They are excellent disinfectant agents not only against the bunt of wheat (*Tilletia tritici*) but are also effective against other seed diseases as for instance the stripe disease of barley (*Helminthosporium gramineum*), the late smut of oats (*Ustilago avenæ*) etc.

It has been ascertained that an addition of a compound of arsenic to the above stated preparations will further increase their effects, especially when applied against root or crown rot (*Phoma betæ*).

To all the above preparations yet other inert substances may be added e. g., kaolin and the different fungicides e. g., copper carbonate, copper chloride, and similar substances, also plant stimulants e. g., manganese chloride and equivalents.

Various changes may be made in the details disclosed in the foregoing specification without departing from the invention and from the principles set forth herein and in the claims annexed hereto.

What I claim is:

1. A non-dusting, dry disinfectant for seeds of good adhering qualities comprising fatty water-insoluble substances having an absorptive capacity for water taken from the class consisting of lecithin, isocholesterin, wool fat and its components, and fungicidal compounds, said disinfectant being substantially free from water-repellant fatty and waxy substances.

2. A non-dusting, dry disinfectant for seeds of good adhering qualities comprising fatty water-insoluble substances having a limited absorptive capacity for water taken from the class consisting of lecithin, isocholesterin, wool fat and its components, water, fungicidal compounds and inert expletive substances, said disinfectant being substantially free from water-repellant fatty and waxy substances.

3. A non-dusting, dry disinfectant for seeds of good adhering qualities comprising fatty water-insoluble substances having an absorptive capacity for water taken from the class consisting of lecithin, isocholesterin, wool fat and its components, and fungicidal mercury compounds, said disinfectant being substantially free from water-repellant fatty and waxy substances.

4. A non-dusting, dry disinfectant for seeds of good adhering qualities comprising fatty water-insoluble substances having an absorptive capacity for water taken from the class consisting of lecithin,, isocholesterin, wool fat and its components, and water-soluble fungicidal mercury compounds, said disinfectant being substantially free from water-repellant fatty and waxy substances.

5. A non-dusting, dry disinfectant for seeds of good adhering qualities comprising wool fat, a water-soluble fungicidal mercury compound and inert expletive substances, said disinfectant being substantially free from water-repellant fatty and waxy substances.

6. A non-dusting, dry disinfectant for seeds of good adhering qualities comprising fatty water-insoluble substances having an absorptive capacity for water taken from the class consisting of lecithin, isocholesterin, wool fat and its components, and fungicidal organic mercury compounds, and containing an arsenic compound, said disinfectant being substantially free from water-repellant fatty and waxy substances.

7. A non-dusting, dry disinfectant for seeds of good adhering qualities comprising fatty water-insoluble substances having an absorptive capacity for water taken from the class consisting of lecithin, isocholesterin, wool fat and its components, and fungicidal compounds, said compounds being taken from the class consisting of mercury and copper compounds, said disinfectant being substantially free from water-repellant fatty and waxy substances.

8. A non-dusting, dry disinfectant for seeds of good adhering qualities comprising fatty water-insoluble substances having an absorptive capacity for water taken from the class consisting of lecithin, isocholesterin, wool fat and its components, and fungicidal organic mercury compounds, said disinfectant being substantially free from water-repellant fatty and waxy substances.

FRITZ WOLFF.